Patented Oct. 23, 1928.

1,688,882

UNITED STATES PATENT OFFICE.

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

ART OF CEMENT MANUFACTURE.

No Drawing.  Application filed September 21, 1927.  Serial No. 221,142.

This invention relates to the manufacture of Portland cement and particularly to the so-called "wet process" for the manufacture of Portland cement. In processes of this type the raw materials are first reduced to the form of a slurry by grinding in the presence of water and the resulting slurry is introduced into the kilns, wherein the water is first driven off and the materials are then calcined and finally clinkered. The heating of the materials in the kilns is ordinarily effected by passing hot combustion gases therethrough countercurrent to the materials, and these gases generally carry off a considerable amount of finely divided solids in suspension therein, together with certain volatile constituents of the materials in gaseous form, which later recondense in the form of fume. It is customary to recover from the exit gases from the kiln, both the mechanically entrained dust and the fume produced as above described, since if these materials were allowed to pass out through the stack they would not only represent a loss of valuable material, but would also be obnoxious and injurious to life and property in the vicinity.

The recovery of this solid material from the gases leaving the cement kilns may be accomplished by electrical precipitation, or by means of settling chambers or spray chambers or by any other usual or well known means for separating suspended solids from gases. The material so collected may be termed cement kiln dust and the terms "dust" and "cement kiln dust" as used hereinafter are to be understood as including both mechanically entrained dust and also fume resulting from volatilization and recondensation of volatile constituents of the raw mix as above described.

It is frequently desired to utilize or conserve part or all of the solid materials so recovered from the kiln gases by returning the same to the kiln with the raw mix slurry, but it is generally impossible or inadvisable to feed this material in a dry state to the kilns along with the slurry, since such materials are of uncertain and non-uniform composition or "off mix" due to varying proportions of dust and fume, and also to the coal contained therein in the case of coal-fired kilns. On the other hand, if the recovered dust is added to the raw slurry in order to permit a correct mix to be maintained, difficulties are encountered due to the fact that the addition of this material causes the slurry to "set up" and become so hard or thick that it cannot be satisfactorily handled.

I am not certain as to the entire cause of this coagulating or setting-up effect, but it appears to be due in part at least to hydration of gypsum formed by interaction of free lime with sulphur dioxide and oxygen in the kiln gases or with alkali sulphates in the dust. The gypsum so formed would tend to take up water of crystallization and set in the same way as ordinary plaster of Paris. It is possible that the alkali sulphates also act upon calcium carbonate contained in the raw mix to form calcium sulphate, and that some alkali carbonates act upon the free lime resulting in the formation of calcium carbonate having the properties of plaster. Any of the above reactions would tend to cause the setting-up to occur. As above stated, however, I do not wish to be limited to any theory as to the causes of this setting-up or as to the manner in which the procedure hereinafter described operates to eliminate such action.

I have found, however, that if the dust recovered from the cement kiln gases is made into a separate slurry by addition of water thereto and is allowed to stand for a suitable period of time, for example for several days, and is then introduced into the main raw mix slurry, the resulting mixture shows substantially no greater tendency to harden or set-up than does the main slurry without addition of the dust thereto. If it be assumed that the hardening action is due to formation of gypsum or calcium carbonate as above described, then the effectiveness of the above procedure may be due to the fact that the formation of such materials is allowed to take its course before mixture with the main slurry, so that no further tendency to set-up occurs after such addition. As above stated, however, I do not wish to be limited to this explanation of the operation of the invention.

Considerable latitude is permissible in the manner of carrying out the treatment of the dust before addition to the main slurry; and the proportion of water to be added to the dust in such treatment, the temperature required, the time of treatment and other factors may advantageously be varied as found most suitable for different plants, due to variations in the composition and nature of the dust and raw mix. As an example of one particular method of carrying out the invention, however, the dust recovered from the cement kiln gases may be mixed with water to form a fairly heavy slurry, by addition of say 25 parts of water to from 50 to 75 parts of dust by weight. The mixture of dust and water may be agitated if desired to secure thorough mixing thereof and this slurry may be stored in any suitable place, for example in storage tanks, or may be run out on to the ground, for example near the place from which the raw materials are obtained. If the slurry is made sufficiently heavy, as for example by mixing 25 parts of water with 75 parts of dust, it may simply be allowed to stand on the ground and harden. After a suitable time, for example from eight to twelve days, the resulting thickened or hardened material may, if necessary be reground, and sufficient water may be added to bring the moisture content up to that of the main slurry, and then mixed in suitable proportions with such main slurry. The proportion in which the dust slurry or hardened material resulting therefrom is mixed with the cement slurry may vary according to the proportion of dust produced in the plant, but such dust slurry may in general be added in any proportion up to 20% or more of the main raw mix slurry. It has been found that addition to the raw mix slurry of dust treated in the above described manner shows substantially no tendency to cause hardening or setting-up to occur in the mixture, so that the same may be handled and introduced into the kilns in the usual manner.

As a modification of the process, particularly when the dust slurry is made sufficiently thick to actually harden and is stored near the rock supply from which the raw materials are derived, the hardened slurry, after a suitable period of aging, may be fed in suitable proportion along with the rock to the mills grinding the raw materials, so as to be ground wet along with the other raw materials to form a slurry of suitable consistency for introduction to the kilns. It will be seen therefore that the dust, after separate treatment with water as above described, may be introduced into the raw mix slurry either by direct addition to such slurry or by adding it to the raw materials and then adding water to the mixture to form the slurry.

I claim:

1. In the wet process of manufacturing Portland cement, the process comprising recovering dust from the kiln gases, mixing such dust separately with water and maintaining such dust and water in contact with one another for a period of time, and then introducing the resulting mixture into the raw mix slurry.

2. The process as set forth in claim 1, in which the dust and water are mixed in such proportions as to form a stiff slurry, and the same is allowed to stand for a sufficient period of time to cause the same to harden.

3. In the manufacture of Portland cement by the wet process, the steps which comprise recovering dust from the kiln gases, mixing water with such dust to form a stiff slurry, allowing said slurry to stand for a sufficient time to set up, and then reducing the resulting material to finely divided condition and introducing the same into the raw mix slurry.

4. In the manufacture of Portland cement by the wet process, the steps which comprise recovering dust from the kiln gases, mixing water with such dust and allowing the mixture to react for a sufficient period of time so that subsequent addition thereof to the raw mix slurry will not materially increase the tendency of such slurry to set up, and then introducing said mixture into the raw mix slurry.

5. The process as set forth in claim 4, in which said mixture is allowed to react for a period of several days before addition to the raw mix slurry.

In testimony whereof, I have hereunto subscribed my name this 27th day of August, 1927.

WALTER A. SCHMIDT.